UNITED STATES PATENT OFFICE.

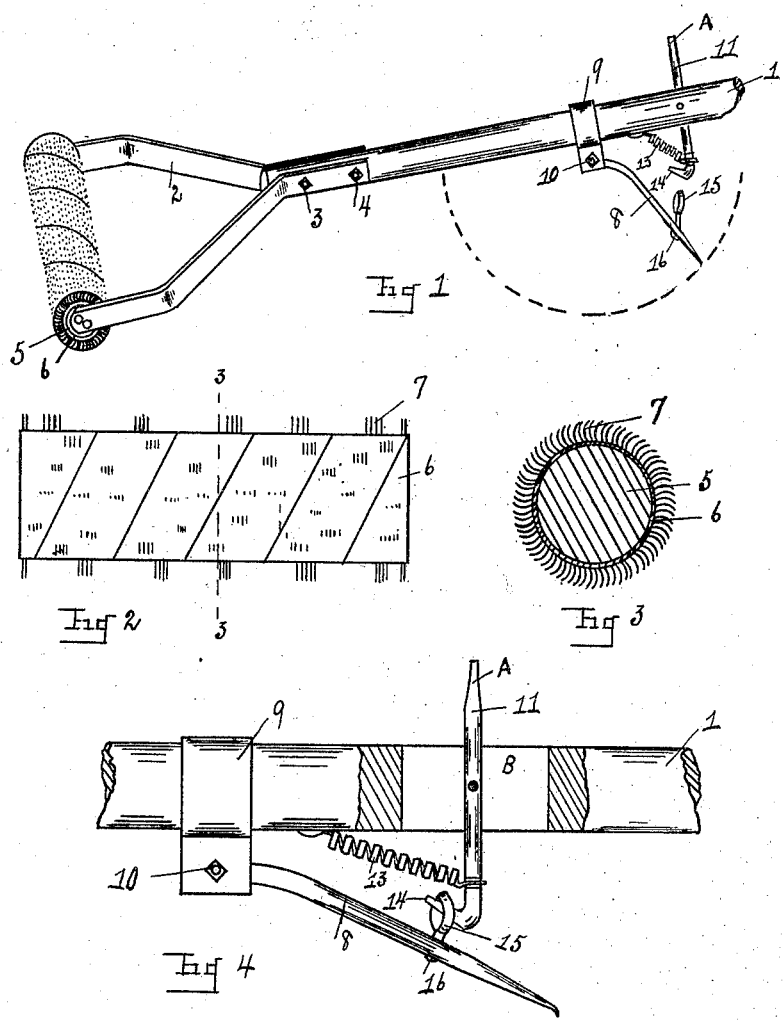

OTTO C. BOFF, OF UTICA, NEW YORK, ASSIGNOR OF ONE-HALF TO WILBERT J. BOFF, OF UTICA, NEW YORK.

CARPET-STRETCHER.

980,404.  Specification of Letters Patent.  Patented Jan. 3, 1911.

Application filed September 9, 1909. Serial No. 516,960.

*To all whom it may concern:*

Be it known that I, OTTO C. BOFF, citizen of the United States, residing at Utica, in the county of Oneida and State of New York, have invented certain new and useful Improvements in Carpet-Stretchers, of which the following is a specification, reference being had therein to the accompanying drawing.

My invention relates to an improvement in carpet stretchers in which a cylinder covered with a wire mattress acts in conjunction with a handle fulcrumed on a tine or tooth to form a leverage, and I declare the following to be a full, clear, concise and exact description thereof sufficient to enable one skilled in the art to make and use the same.

The object of my invention is to provide a device which is simple in operation, cheap in construction and easily portable. The device is designed to effectively stretch a carpet to any tension desired without much effort being exerted by the operator.

I attain these objects by the mechanism illustrated in the accompanying drawings in which, Figure 1 is a perspective view of my device; Fig. 2 is an enlarged front elevation of the carpet engaging roller; Fig. 3 is a section, similarly enlarged, taken on line 3—3 of Fig. 2; Fig. 4 is a detail view enlarged and partly in section of the tine or tooth and its retaining mechanism.

Similar letters refer to similar parts throughout the several views.

The handle 1 and the fork 2 constitute the framework of the device. The fork 2, which is of metal is fashioned of two similar tines, forming a Y shaped fork, which are bolted as at 3 and 4 or otherwise secured to the respective sides of handle 1 in a proper manner for rigidly retaining at the ends thereof a wooden cylinder 5 covered with a wire mattress, which consists of strips of felt 6, laden with short wires 7, wound obliquely about the cylinder. This or any other suitable material may be used for engaging the carpet to be stretched. Cylinder 5 is held to the ends of fork 2 by screws 20 and 21 at either end. Said screws 20 and 21 are adapted to be removed whereby wooden cylinder 5 may be partially revolved in order to present a new surface to engage the carpet.

My embodiment of the mechanism for leverage purposes and for holding the wire mattress in any desired position along the carpet contemplates a tine or sharp tapering pointed tooth 8, curved in the manner shown and pivotally mounted to a collar or ring 9 which encompasses the handle 1 and is bolted thereto at a suitable distance from the fork bearing end of handle 1, as at 10. In order to hold the tine or tooth 8 in locked position, I provide a latch 11 which is pivotally mounted in a recess B in handle 1 and held normally by spring 13 secured to the forward under side of handle 1. Latch 11 is extended above handle 1 into a thumbpiece A. The beak 14 of latch 11 is angularly disposed in order to ride over and hook in eye 15 secured to tine 8 by bolt 16 passing therethrough.

The operation of the device is as follows: The operator having tacked down the carpet along one side of the room, works, by a series of thrusts, the device along the carpet toward the opposite side where, by a final thrust, the carpet being held in the desired position and at the desired tension the operator lowers the handle and, if he has not already done so, he releases tine 8 by pushing forward with his thumb on thumb-piece A. When the handle has been lowered sufficiently the beak 14 of latch 11 rides, against the tension of spring 13, over eye 15 and hooks therein. Tine 8 may be held in an advantageous position for leverage purposes when it is lowered sufficiently to come in contact with the carpet, by pressing the foot against it on the side adjacent to the operator. The bending of tine 8 in the manner described permits its engaging with the carpet at an acute angle, so that the carpet may easily slide up the tine and not hold the carpet at that point from being stretched to the side of the room where desired. A further use of tine 8 is to serve as a fulcrum upon which handle 1 may swing in order to stretch the carpet by the downward movement of handle 1 to its ultimate locked position, which movement pushes forward carpet engaging roller 5.

Having described my invention what I claim as new and desire to secure by Letters Patent is:

1. In a carpet stretcher, the combination with carpet engaging means and a handle secured thereto, of a tapering floor engaging member pivoted to said handle and a latch pivoted to said handle and actuated by a spring whereby to lock said handle and said floor engaging member, substantially as described.

2. In a carpet stretcher, the combination of a handle terminating in a fork adapted to hold carpet engaging means, an angularly bent tapering pointed tooth pivoted to said handle and adapted to act as a fulcrum upon which said handle is levered to stretch the carpet forward, and a latch actuated by a spring adapted to automatically engage an eye on said tapering tooth whereby to lock said handle and said tooth in given position, substantially as described.

3. In a device of the character described, the combination of a handle holding at one end carpet engaging means and said handle pivotally holding a tapering tooth adapted to engage the carpet at an acute angle, and a spring actuated latch mounted upon said handle adapted to automatically engage with an eye secured to said tapering tooth whereby to lock said parts, substantially as described.

4. In a carpet stretcher, the combination of a handle holding at one end a fork adapted to hold a roller covered with carpet engaging means, a collar pivotally holding an angularly bent tapering tooth, mounted upon said handle and a spring actuated latch pivotally held to said handle whereby said handle and said tooth may be automatically locked whereby to hold the carpet in stretched position, substantially as described.

In testimony whereof I have hereunto affixed my signature in the presence of two witnesses.

OTTO C. BOFF.

Witnesses:
ERWIN L. HOCKRIDGE,
HENRY M. LOVE.